(12) United States Patent
Snyder et al.

(10) Patent No.: US 9,624,399 B2
(45) Date of Patent: Apr. 18, 2017

(54) METHOD FOR MICROENCAPSULATING BLOWING AGENTS AND RELATED PRODUCTS

(71) Applicant: ND Industries, Inc., Clawson, MI (US)

(72) Inventors: Desiree N. Snyder, Metamora, MI (US); Norman M. Rawls, Sterling Heights, MI (US)

(73) Assignee: ND Industries, Inc., Clawson, MI (US)

( * ) Notice: Subject to any disclaimer, the term of this patent is extended or adjusted under 35 U.S.C. 154(b) by 67 days.

(21) Appl. No.: 14/617,489

(22) Filed: Feb. 9, 2015

(65) Prior Publication Data

US 2015/0232692 A1    Aug. 20, 2015

Related U.S. Application Data

(60) Provisional application No. 61/941,209, filed on Feb. 18, 2014.

(51) Int. Cl.

| | |
|---|---|
| *B01J 13/08* | (2006.01) |
| *B01J 13/14* | (2006.01) |
| *F16B 39/22* | (2006.01) |
| *C09D 163/00* | (2006.01) |
| *B29B 15/00* | (2006.01) |
| *C09D 133/08* | (2006.01) |
| *F16B 33/00* | (2006.01) |

(52) U.S. Cl.
CPC ............ *C09D 163/00* (2013.01); *B01J 13/08* (2013.01); *B01J 13/14* (2013.01); *B29B 15/00* (2013.01); *C09D 133/08* (2013.01); *F16B 33/004* (2013.01); *F16B 39/225* (2013.01)

(58) Field of Classification Search
None
See application file for complete search history.

(56) References Cited

U.S. PATENT DOCUMENTS

| | | | |
|---|---|---|---|
| 7,600,957 B2 | 10/2009 | Phillips | |
| 7,771,148 B2 | 8/2010 | Phillips | |
| 2005/0241756 A1* | 11/2005 | Harthcock | ............... C08J 3/241 156/305 |
| 2007/0292241 A1* | 12/2007 | Snow | .................... F16B 39/225 411/542 |

(Continued)

OTHER PUBLICATIONS

Chemical Based Microencapsulation Technologies, downloaded from http://microencapsulationinnovations.com/Chemical.html on Feb. 9, 2015.

*Primary Examiner* — Mary F Theisen
(74) *Attorney, Agent, or Firm* — Warner Norcross & Judd LLP

(57) ABSTRACT

A method for microencapsulating a core material, such as a blowing agent, in a single shell which has demonstrated to be challenging to microencapsulate as an individual component with a single-shell wall deposition using conventional techniques. Single-shell microcapsules of the blowing agent can be formed, minimizing steps involved in the present microencapsulation technique. Also, microcapsules formed by this method provide increased performance in end-use products, including but not limited to characteristics such as product shelf-life, ease of use, and greater expansion properties. A method of making a coating formulation including the microcapsules is further provided, as well as a fastener including the coating.

12 Claims, 4 Drawing Sheets

(56) References Cited

U.S. PATENT DOCUMENTS

2009/0176098 A1\* 7/2009 Masuda ................... B01J 13/14
  428/407
2010/0051220 A1\* 3/2010 Hong ....................... B01J 13/14
  162/138

\* cited by examiner

NOTE EXPANSION OF LIQUID PRODUCT

METHOD FOR MICROENCAPSULATING BLOWING AGENTS AND RELATED PRODUCTS

TECHNICAL FIELD

The present invention relates generally to microencapsulation of a reactive formulation component, and the incorporation of resulting microcapsules into formulations and coatings adapted for use with plugs and fasteners. The microcapsules are designed and formulated to use a single-shell microencapsulation technique to protect the reactive component, for example, a chemical blowing agent, from other reactive components in an adhesive, sealant and/or other formulation until the desired time of reaction of the blowing agent with other components.

BACKGROUND OF THE INVENTION

Microencapsulation of reactive formulation components can be chemically achieved through single or multiple depositions of shell wall materials to core materials. Such processes include Interfacial Polymerization, Complex Coacervation and In-Situ Polymerization. These processes can be used individually to deposit a single shell wall over a desired core material.

In addition, there are instances in which multiple layers of a single type of shell wall or multiple layers of various combinations of shell wall materials are used to achieve certain microcapsule properties. These properties include minimization of "free" core material or material that does not get encapsulated, increased shelf-life of the finished microcapsules, increased protection of the core material from environmental conditions imposed upon the microcapsules due to incorporation into a formulation involving either polar or non-polar solvents.

However, performing multi-layer shell deposition and/or multiple-process microencapsulation complicates and can greatly increase the number of steps involved in forming microcapsules of the desired quality. Thus, single shell deposition frequently is utilized to address these issues.

Further, complications in microencapsulation are more pronounced with certain compounds. Such is the case with the blowing agent methyl hydrogen silicone fluid. Because of the reactivity of this core material, the chemical microencapsulation processes available for use are limited to Complex Coacervation and In-Situ Polymerization. However, single-shell microencapsulation by either of these methods individually usually is not adequate to fully encapsulate the blowing agent, resulting in unencapsulated core material, poorly formed caps or shells, leaky caps or shells that enable the core material to escape the shell, or no caps or shells, depending on the formation conditions.

A combination of these two methods, Complex Coacervation and In-Situ Polymerization, can be used to deposit first a gelatin shell via Complex Coacervation followed by deposition of a polyoxymethylene urea shell via In-Situ Polymerization, or these processes can be used in reverse to deposit first a polyoxymethylene urea via In-Situ Polymerization followed by a gelatin shell via Complex Coacervation. While this provides slightly better results than the single-shell process, in that microcapsule formation is more often achieved, the microcapsules formed typically are not in the form of dry, free-flowing powder, and still tend to leak or have large amounts of "free" core material that remains un-encapsulated. Thus, microcapsules so formed often are not adequate for use in a final formulation because they are difficult to handle and process, and when mixed with other reactive components, the core material tends to immediately react with those components, which results in early expansion of the material before expiration of a desired latency period. Further, in cases where the inferior microcapsules are sufficiently formed, they typically do not provide the desired material shelf-life.

SUMMARY OF THE INVENTION

A method for microencapsulating a core material is provided. In the method, a single microencapsulation process is performed via In-Situ Polymerization on a difficult to encapsulate core material. First, the core material is suspended within an easier to encapsulate secondary core material, which will act as a protective layer or pseudo shell on the core material. Second, the protective secondary core material (or pseudo shell) and core material (isolated within and surrounded by the protective secondary core material) are microencapsulated in a final polymerized shell material to form microcapsules.

In one embodiment, to facilitate microencapsulation, several parameters or characteristics are present in the materials. First, the core material and the protective secondary core material generally are not chemically reactive with one another. That is, when mixed, they do not set off or catalyze reactions that significantly modify their chemical structure or composition. Second, both the core material and the protective secondary core material are not soluble in water. Third, the core material is at least slightly more hydrophobic than the protective secondary core material.

With regard to hydrophobicity and the above third parameter, using Hansen solubility parameters, the relative energy difference (RED) between the protective secondary core material and water can be calculated. The RED between the core material and water also can be calculated. The RED for the protective secondary core material (or pseudo shell) and water can be between 10% and 90% lower than, 20% to 80% lower than, or at least about 50% lower than the RED for the core material and water. It has been discovered that this difference in hydrophobicity enables and/or drives the core material to be isolated within and/or protected or surrounded by the protective secondary core material when the blend of core material and protective secondary core material is emulsified into aqueous solution as part of the microencapsulation process, thus allowing the protective secondary core material to be at the surface of each individual droplet and ensuring acceptance of the final polymerized shell material for deposition at the interface between the aqueous solution and the protective secondary core material.

In addition, it can be helpful in the embodiments herein when the microencapsulation reaction conditions for the protective secondary core material to be microencapsulated in a shell material as an individual component is well-established.

In another embodiment, as the In-Situ Polymerization proceeds, within each emulsion droplet, the core material is completely or substantially surrounded or protected by the protective secondary core material. In turn, this can prevent the reactive core material from influencing the reaction conditions required for shell-deposition at the droplet surface in the microencapsulation process. Thus, the microencapsulation process can be conducted under the same reaction parameters as the protective secondary core material would be if the protective secondary core material was being encapsulated individually, by itself.

In still another embodiment, the core material used in the method can be a blowing agent, such as methyl hydrogen silicone fluid, which as used herein can include methyl hydrogen silicone, methyl hydrogen polysiloxane, and mixtures thereof.

In yet another embodiment, the shell material can be a formaldehyde-urea shell material. As a further example, the shell material can be selected from the group consisting of polyoxymethylene urea, melamine modified polyoxymethylene urea, resorcinol modified polyoxymethylene, urea and mixtures thereof.

In even another embodiment, the protective secondary core material can be selected from the group consisting of acrylate, methacrylate, epoxy and mixtures thereof. Optionally, the protective secondary core material can be a reactive species that will chemically react with another compound present where the microcapsules are included in a coating. As an example, the protective secondary core material can be an epoxy, which reacts with a curing agent present in a coating to harden.

In a still yet another embodiment, the microencapsules formed with the present process can be isolated to produce a free flowing powder. This powder, or generally the microcapsules, can be incorporated into at least one of an expandable sealant and/or an adhesive. Optionally, the protective secondary core material can be adapted to chemically react with another component of the at least one of an expandable sealant and adhesive.

In still yet even another embodiment, the free flowing powder, which can include a plurality of single shell microcapsules (formed as mentioned above), is admixed with at least one of a curing agent, a binder and a reactive component to form at least one of an expandable sealant and adhesive. The reactive component can be adapted to react with the microencapsulated blowing agent when the at least one of an expandable sealant and adhesive is activated.

In a further embodiment, the expandable sealant and/or the adhesive can be coated on threads of a fastener, such as a screw, or on one or more surfaces of a fastener, such as a washer.

In still a further embodiment, a fastener is provided. The fastener includes a surface and a coating disposed on the surface. The coating can be dry to the touch after the removal of solvent. The coating can include single shell microcapsules dispersed in a resin. The microcapsules can include a reactive core of a blowing agent completely surrounded by the protective secondary core material. The protective secondary core material and the reactive core can be fully encapsulated in a final polymerized exterior shell material.

In yet a further embodiment, the coating can be coated on the surface of the fastener. The coating can be designed to at least one of expand, fill and/or seal a space between the fastener and some other structure. The other structure can be an aperture through which or around which the fastener is placed. Effectively, when activated, the coating can lock the fastener in or adjacent the aperture. It also or alternatively can prevent a fluid from passing around the fastener.

The current embodiments offer a simple and effective method for the encapsulation of difficult, often reactive materials, via a single-shell process with the benefits of a multiple-shell process, while avoiding the extra steps involved in multiple-process microencapsulation. The resultant microcapsules can be incorporated into a coating or other formulation to provide beneficial reactivity of the core material and other reactive components. Where included on a fastener, the fastener can have exceptional sealing, adhesion and/or locking properties to enhance the usability of the fastener.

These and other objects, advantages, and features of the invention will be more fully understood and appreciated by reference to the description of the current embodiment and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
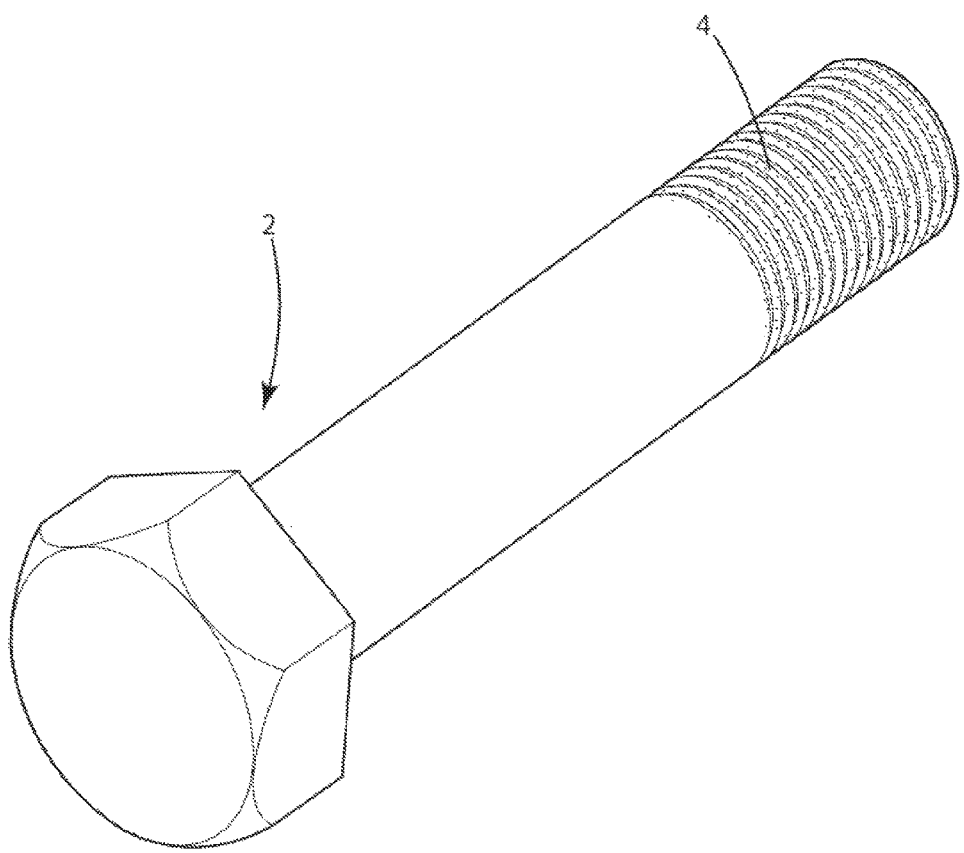
FIG. 1 is a perspective view of a fastener having a coating produced by a method of a current embodiment.
Figure 2:
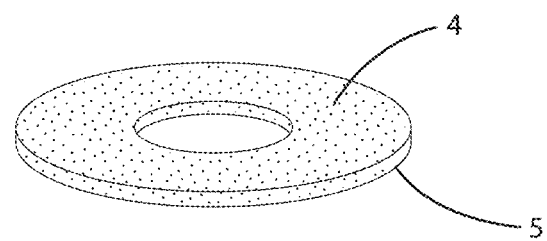
FIG. 2 is a perspective view of an alternative fastener having the coating produced by the methods of the current embodiment.

Generally, the microcapsules produced by the methods of the current embodiments can be formulated with other compounds or components to form coatings or other materials designed for application to structural components, optionally fasteners. An exemplary fastener, in the form of a bolt 2, is shown in FIG. 1. The coating 4 can be coated on or otherwise disposed on the threads of the bolt, or some other area designed to engage a work piece or hole in a work piece. This engagement of fastener to work piece creates forces and pressures that rupture the microcapsules of the current embodiments, thereby setting off one or more reactions that cause the coating to expand, fill, seal, lock, or otherwise modify a space or gap between the fastener and the work piece. In turn, the coating locks the fastener in place and/or seals around the fastener to prevent fluids from passing thereby, through spaces or gaps. An alternative fastener, in the form of a washer is illustrated in FIG. 2. There, the washer 5 also includes the coating 4. The washer 5 can be placed on a bolt, around a hole. When the bolt is tightened, the washer and coating are compressed, thereby rupturing the microcapsules and causing a desired reaction in the coating.

Figure 3:
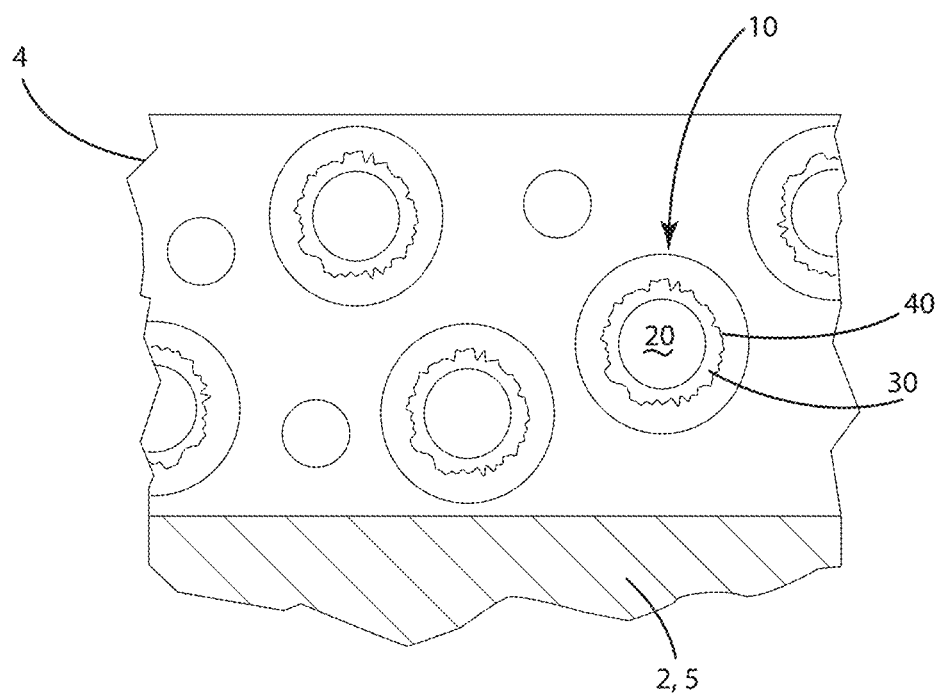
FIG. 3 is a cross section view of the coating illustrating the microcapsules produced by the methods of the current embodiment.

The coating or other material within which the microcapsules herein can be included can be formulated to function as an adhesive, a sealant, a lubricant, a masking material, an anti-seize compound and/or combinations of the foregoing. An exemplary coating containing the microcapsules is illustrated in FIG. 3 and generally designated 4. The coating can be applied to fasteners 2, 5 or other structural components. Generally, the coating is dry to the touch on the fastener surfaces through the removal of solvent, facilitating easy handling of the treated fasteners. The coating can include a variety of other compounds, in addition to the microcapsules 10, such as curing agents, solvents, binders, pigments and other optional components, some of which may be capable of reacting with at least one of the reactive core 20, protective secondary core material (or pseudo shell) 30, and the polymerized exterior shell material 40.

Suitable curing agents can include compounds selected from the group consisting of aliphatic, cycloaliphatic, aliphatic modified amines and mixtures thereof. Where the microcapsules include a protective secondary core material (or pseudo shell) such as epoxy, optional curing agents can be methylene bridged poly(cyclohexyl-aromatic) amines. Other polyamine curing agents may be used in combination, which include aromatic poly amines such as diethyltoluenediamine, and methylenedianaline, aliphatic amines such as di(4-aminocyclohexyl)methane. Other polyamine curing agents include isophoronediamine, 1-3 xylylenedamine, and polyalkylene polyamines such as diethyelenetriamine and triethylenetriamine and the mixed methylene bridged poly(cyclohexylaromatic)amine, 4(4'-aminobenzyl)cyclohexylamine. Other curing agents can be included, such as those disclosed in U.S. Pat. No. 7,771,148 to Phillips, which is hereby incorporated by reference in its entirety. Organic peroxides also make up a group of suitable curing agents for systems in which the microcapsules include a protective secondary core material (or pseudo shell) comprising an acrylic based resin. These peroxides can include but not be limited to benzoyl peroxide and/or blends containing benzoyl peroxide, tertiary-butyl perbenzoate, cumene hyroperoxide, and similar compounds.

Solvents suitable for use herein include organic solvents such as an aromatic organic solvent. Particular examples include benzene, xylene, toluene, styrene and mixtures thereof.

A suitable binder can be selected from the group consisting of polyvinyl alcohol, polyvinyl butyral, polyvinyl acetate, poly(methyl methacrylate), mixtures thereof, or other vinyl acetal.

The microcapsules can be in the form of free flowing powder when produced. The microcapsules 10 themselves can be generally of a spherical shape and can have an average diameter from optionally about 30 microns to about 500 microns, further optionally about 60 microns to about 130 microns, and even further optionally less than or at least about 90 microns.

Figure 4:
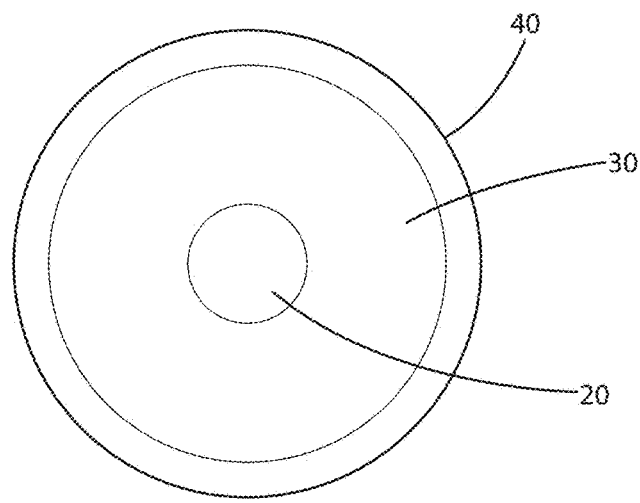
FIG. 4 is a side view of the microcapsules that may be produced by the methods of the current embodiment.
Figure 5:
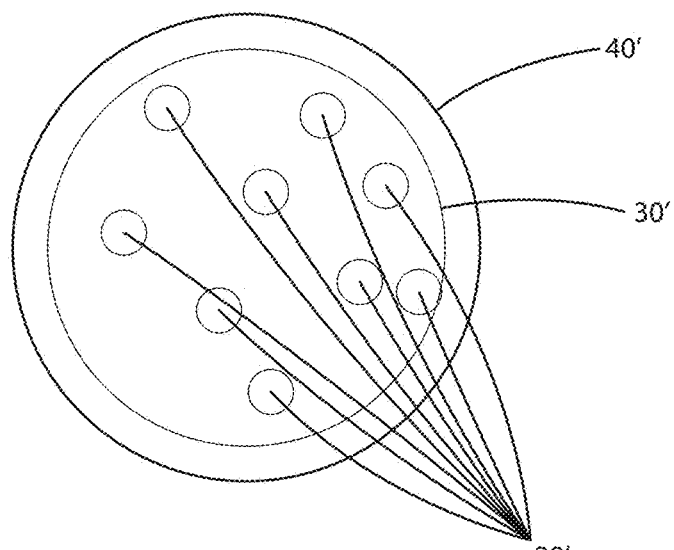
FIG. 5 is an alternative view of the microcapsules that may be produced by the methods of the current embodiment.

As shown in FIGS. 4 and 5, the microcapsules 10 can include a core material 20, a protective secondary core material 30 and a single exterior polymerized shell material 40. As shown in FIG. 4, the core material 20 can be a single element, or as shown in FIG. 5, the core material 20' alternatively can be in the form of multiple, individual core material elements, all disposed within the protective secondary core material 30', which is surrounded by or encapsulated within the exterior shell 40'. The core material 20, 20' can be a reactive material, which, when subjected to water, gases, liquids, or other particular chemical compounds can initiate a reaction. Suitable core materials for use in the embodiments herein include blowing agents, such as methyl hydrogen silicone fluid, which as used herein can include methyl hydrogen silicone, methyl hydrogen polysiloxane and mixtures thereof.

The protective secondary core material 30, 30' can be constructed from materials such as inert oils, plasticizers, solvents, and/or reactive resins that will contribute to an adhesive or sealant formulation by reacting with other components upon rupture of the incorporated microcapsules. In particular, the protective secondary core material can be one or more resins, selected from the group consisting of acrylate, methacrylate, epoxy, and mixtures thereof. Other protective secondary core material can be selected depending on the application and desired activity of the protective secondary core material.

The shell material of the exterior polymerized shell, which is illustrated as a single shell of the microcapsule in FIGS. 4 and 5, can be a polyoxymethylene urea, melamine modified polyoxymethylene urea, and/or resorcinol modified polyoxymethylene urea pre-polymer shell material suitable for In-Situ Polymerization process, and mixtures thereof. Molar ratios of formaldehyde to amine used in the shell can range from 1.1:1 to 3:1, depending on the amine or blend of amines being used; optionally 1:1 for formaldehyde-resorcinol shell resin, 2:1 for formaldehyde-urea shell resin, or 3:1 for formaldehyde-melamine shell resin. Also, for melamine modified urea-formaldehyde shell resin, a ratio of formaldehyde to the combined urea and melamine can be between 1.5:1 and 3:1, optionally around 2:1. Optionally, all of the current embodiments are described in connection with a single polymerized and/or cross-linked exterior shell; however, one or more additional polymerized and/or cross-linked shells may be present, and further exterior to the single exterior shell.

The activator(s) for the core material may be the same or different from the curing agents for the coating, depending on the system into which the microcapsules are being incorporated. Suitable activators for the core material include aliphatic, cycloaliphatic, aliphatic modified amines and mixtures thereof. Optional activators can be methylene bridged poly(cyclohexyl-aromatic)amines. Other polyamine activators may be used in combination, which include aromatic poly amines such as diethyltoluenediamine, and methylenedianaline, aliphatic amines such as di(4-aminocyclohexyl)methane. Other polyamine activators can include isophoronediamine, 1-3 xylylenedamine, and polyalkylene polyamines such as diethyelenetriamine and triethylenetriamine and the mixed methylene bridged poly(cyclohexylaromatic)amine, 4(4'-aminobenzyl)cyclohexylamine. Other activators can be included, such as those disclosed in U.S. Pat. No. 7,771,148 to Phillips. Additional activators may include acidic, basic and oxidizing materials.

For the microcapsules herein to work as desired, the core material and protective secondary core material can have unique relationships, properties and reactivity. First the protective secondary core material and the core material are miscible. Second, the hydrophobicity of the protective secondary core material ranges from slightly less than that of the core material to significantly less than the core material while solubility in water remains negligible to not soluble. Using Hansen solubility parameters, the relative energy difference or RED between the protective secondary core material and water can be calculated. The RED between the core material and water can also be calculated. The RED for the protective secondary core material (or pseudo shell) and water can be between 10% and 90% lower than, 20% to 80% lower than, or at least about 50% lower than the RED for the core material and water. Optionally, the protective secondary core material can be 10% to 100%, 20% to 50%, or at least 25% less hydrophobic than the core material. Third, the protective secondary core material is not reactive with the core material. However, the protective secondary core material can be selectively reactive with other compounds in the coating external to the exterior polymerized shell. For example, where the protective secondary core material is epoxy based, upon rupture of the microcapsule, it can react with a curing agent present in an adhesive and/or a sealant into which the microcapsules are incorporated.

Fourth, the core material is not soluble in water, with its hydrophobicity ranging from slightly more than the protective secondary core material (or pseudo shell) to significantly more than the protective secondary core material. Using Hansen solubility parameters, the relative energy difference (RED) between the core material and water can be calculated. The RED between the protective secondary core material and water can also be calculated. The RED for the core material and water can be between 10% and 90% higher than, 20% to 80% higher than, or at least about 50% higher than the RED for the protective secondary core material and water. In addition, the core material is miscible in the protective secondary core material. A solvent, such acetone or isopropyl alcohol, may be used as desired to achieve desired protective secondary core material and core material compatibility, if necessary, so that the protective secondary core material can properly protect and/or surround the core material when emulsified into an aqueous media. The core material can be a suitable reactive component for end use, in this case a blowing agent for adhesive and/or sealant formulations. The core material presently utilized is methyl hydrogen silicone fluid.

Generally, the protective secondary core material acts to surround and protect the core material, thus forming a suitable surface at the droplet/aqueous media interface onto which the exterior polymerized shell can deposit while preventing the core material from influencing the shell deposition reaction by minimizing or eliminating the contact of the core material with the droplet/aqueous media interface. Optionally, after the admixing of the core material and the protective secondary core material, the core material is not present at the droplet/aqueous media interface which is formed substantially by the outermost extent or barrier of the protective secondary core material. The protective secondary core material is amorphous and has a non-rigid, deformable exterior. This can contrast the shell, which can be relatively rigid and of a definite, predefined geometry, such as a sphere. The shell also can be rupturable, for example, it can be crushed thereby expelling the contents thereof.

Other factors involved in producing microcapsules via the microencapsulation process herein include but are not limited to use of surfactants, materials used for pH adjustments, and reaction catalysts. The surfactant choice can depend on the protective secondary core material, and can be any one of the following or combination of the following: anionic, nonionic and/or cationic. The surfactant can be selected to achieve desired emulsion droplet surface chemistry, which is known in the art and need not be discussed in detail here. Suitable examples of surfactants can include: polyoxyethylene dinonylphenyl ether phosphate, ethylene maleic anhydride, styrene maleic anhydride, polyvinyl alcohol, type A Bloom 250 gelatin, octylphenol ethoxylate, (2,4,7,9-tetramethyl-5-decyne-4,7-diol) and mixtures of the foregoing. Surfactant in or emulsifying agents in the microencapsulation process can range from 0% to 20%, 0.1% to 5%, or less than about 2% by weight. The same can be said for acids and/or bases used for pH adjustments during the microencapsulation process herein. An optional reaction catalyst is ammonium chloride and may be used when applicable in the microencapsulation process. Determining need for use and/or concentration of such reaction catalysts is known in the art and need not be detailed at this time.

Microencapsulation of the current embodiments generally includes a process wherein a protective secondary core material (or pseudo shell) is first used to surround and/or protect a reactive core material, such as a blowing agent, in an aqueous mixture. This mixture is then combined with a pre-polymer solution including a shell material, which is prepared initially separately from the mixture. Upon this admixing and pH adjustment of this mixture, the shell material reacts at the droplet/aqueous media interface such that the shell material microencapsulates the protective secondary core material with the core material therewithin, thereby forming the microcapsules. The microcapsules formed in this process are of a single shell configuration, with the exterior polymerized shell material containing, surrounding and generally enclosing the protective secondary core material (or pseudo shell) that itself protects the core material. After appropriate formation, the single shell microcapsules can be filtered, separated, and dried or otherwise isolated from the other components of the admixed materials. In most cases, this produces a dry, free flowing powder.

After formation, the isolated microcapsules can be added to or mixed with a curing agent, a binder and/or a reactive component to form at least one of an expandable sealant and an adhesive. The reactive component can be adapted to react with the microencapsulated blowing agent when the at least one of an expandable sealant and adhesive is activated, as provided in the examples below.

Methods and compositions of the current embodiment is illustrated in, but not intended to be limited by, the following examples.

EXAMPLE 1

Preparation of Shell Material Prepolymer

In this step, a shell material pre-polymer was prepared. This was done separately from the production of the mixture in Example 2 below. A bulk solution of melamine modified urea-formaldehyde prepolymer with concentration of 50% by weight was prepared in advance. 351.3 g 37% formaldehyde solution, 8.1 g triethylenolamine, 126.4 g urea, and 14.2 g melamine were reacted at 68° C. for 2 hours under the application of heat via a heating unit. The heating unit for the reaction vessel was then turned off. 500.0 g deionized water was added and the prepolymer was allowed to mix for another hour before being neutralized with hydrochloric acid. This solution is allowed to cool very slowly overnight before being used.

EXAMPLE 2

Preparation of Microencapsulated Methyl Hydrogen Silicone Fluid

In this step, the prepolymer was further prepared before emulsifying the blend of protective secondary core material and core material. 285.44 g deionized water was added to 313.04 g prepolymer solution (as prepared in Example 1) and the solution was allowed to reach the desired reaction temperature of around 40° C. before continuing. After the solution has reached the desired temperature, 13.20 g polyoxyethylene dinonylphenyl ether phosphate, trade name Rhodofac RM-710 commercially available from Rhodia of Cranbury, N.J., was added as an emulsifying agent for the protective secondary core material. The pH was then adjusted to around 7.5 using sodium hydroxide.

In this step, a blowing agent was admixed with an epoxy resin, which acts as the protective secondary core material (or pseudo shell). This can be done separately from the production and preparation of the prepolymer in Example 1 and the steps immediately above. In a separate mixing vessel, 3.76 g core material, methyl hydrogen silicone fluid, trade name GP236 commercially available from Genesee Polymers Corporation of Burton, Mich., was blended with 168.88 g of the protective secondary core material (or pseudo shell), bisphenol F epoxy resin, trade name Araldite GY282 commercially available from Huntsman of The Woodlands, Tex., until uniform.

After being thoroughly blended, the epoxy/methyl hydrogen silicone fluid mixture was emulsified into the prepolymer solution described above to form a slurry until a suitable droplet size was obtained. Hydrochloric acid was then used to reduce the pH of the system to around 4.0 in order to begin the deposition of the shell onto the droplets of epoxy resin, which was in turn protecting the methyl hydrogen silicone fluid from interacting with the droplet/aqueous interface. Following two hours of mixing at a reaction temperature of around 40° C., 0.80 g ammonium chloride was added. The reaction vessel was then covered and allowed to continue reacting at temperature overnight.

The following day, microcapsules are fully formed and the slurry was neutralized using sodium hydroxide. Following several rinses with deionized water, the microcapsules were filtered and allowed to dry overnight at ambient temperature before 6.0 g wax-treated silica was added as an anti-caking agent. The microcapsules formed are a free-flowing powder and individual microcapsules are spherical.

EXAMPLE 3

Preparation of Microencapsulated Methyl Hydrogen Silicone Fluid

In this example, the prepolymer was further prepared before emulsifying the blend of protective secondary core material and core material. 293.68 g deionized water was added to 315.52 g prepolymer solution (as prepared in Example 1) and the solution was allowed to reach the desired reaction temperature of around 40° C. before continuing. After the solution has reached the desired temperature, 4.00 g of octylphenol ethoxylate surfactant, trade name Triton X-45 commercially available from The Dow Chemical Company of Midland, Mich., along with 0.80 g of an 8.3% solution of type A Bloom 250 gelatin, was added as emulsifying agents for the protective secondary core material. The pH was then adjusted to about 8.3 using sodium hydroxide.

In another step, a blowing agent was admixed with an acrylic resin, which acts as the protective secondary core material (or pseudo shell). This was done separately from the production and preparation of the prepolymer in Example 1 and the steps immediately above. Specifically, in a separate mixing vessel, 3.68 g core material, methyl hydrogen silicone fluid, trade name GP236 from Genesee Polymers Corporation, was blended with 180.64 g of the protective secondary core material (or pseudo shell), ethoxylated bisphenol a dimethacrylate, trade name SR101 from Sartomer, until uniform.

After being thoroughly blended, the dimethacrylate/methyl hydrogen silicone fluid mixture was emulsified into the prepolymer solution described above to form a slurry until a suitable droplet size was obtained. Hydrochloric acid was then used to reduce the pH of the system to about 3.8 in order to begin the deposition of the shell onto the droplets of dimethacrylate resin, which was in turn protecting the methyl hydrogen silicone fluid from interacting with the droplet/aqueous interface. Following two hours of mixing at a reaction temperature of around 40° C., 0.80 g ammonium chloride was added. The reaction vessel was then covered and allowed to continue reacting at temperature overnight.

The following day, microcapsules were fully formed and the slurry was neutralized using sodium hydroxide. Following several rinses with deionized water, the microcapsules were filtered and allowed to dry overnight at ambient temperature before 6.0 g wax-treated silica was added as an anti-caking agent. The microcapsules formed were a free-flowing powder and individual microcapsules were spherical.

EXAMPLE 4

Coating Formulation Preparation

A shelf stable composition was prepared by dissolving 9 grams of a methacrylate co-polymer resin under the trade name of Elvacite 2550, into 70.5 grams of toluene. After the methacrylate resin was dissolved into the toluene, 20.1 grams of a cycloaliphatic amine activator under the trade name Amicure PACM was added to the solution. Additionally, 1.4 grams of treated fumed silica under the trade name Cabosil TS-720 was dispersed into the solution. After the silica was dispersed, 60 grams of an encapsulated novalac epoxy and 20 grams of an encapsulated blend of 2% methylhydrosilicone fluid and 98% GY282 epoxy resin was added into the solution using a paddle blade. After mixing was completed, the contents were moved into a storage vessel.

EXAMPLE 5

Coated Fastener Properties

A portion of the contents from the previous Example 4 were flow coated onto zinc phosphate M10×1.5 bolts. These bolts were dried in a 135° C. oven for 5 minutes before being removed. The parts were allowed to cool to room temperature overnight. After the bolts had cooled, an M10×1.5 zinc plated nut was installed on to the zinc phosphate bolt. The material was allowed to react for 24 hours. The cured material had an average breakaway strength of 41.4 Nm and an average prevailing strength 29.6 Nm. Material was observed bubbling out between the mating fasteners indicating that expansion took place.

EXAMPLE 6

Improved Product Stability

Figure 6:
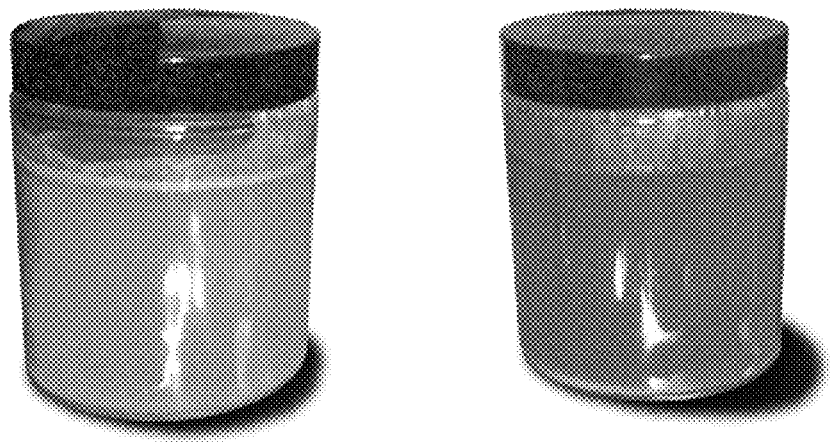
FIG. 6 is a comparative image of two formulations from Example 6 below, immediately following mixing.
Figure 7:
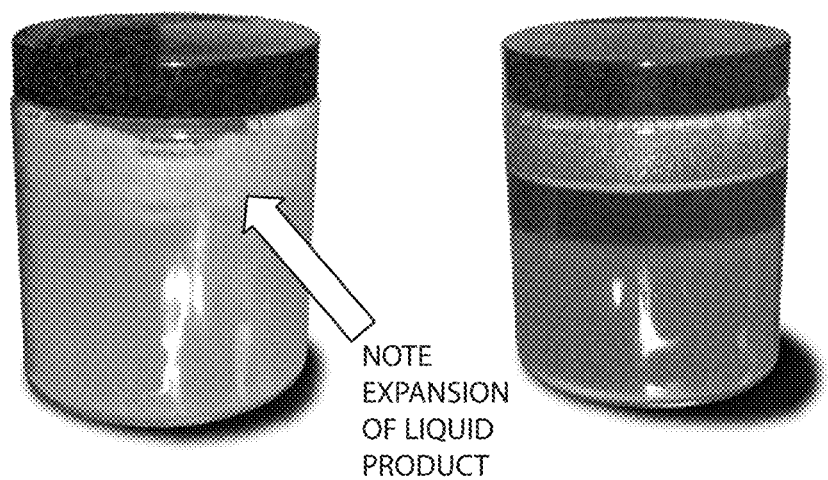
FIG. 7 is a comparative image of two formulations from Example 6 below, six hours after mixing.

Two formulations were prepared as in Example 4. One formulation, made pink for easy identification, utilized traditionally prepared methyl hydrogen silicone fluid microcapsules. These microcapsules contain only the methyl hydrogen silicone fluid in the core (with no secondary protective core material (or pseudo shell)) and utilize at least a double shell structure, with each shell being comprised of different polymer materials, that is, polyoxymethylene urea, cross-linked type a Bloom 250 gelatin, etc. The second formulation, made blue for easy identification, utilized methyl hydrogen silicone fluid microcapsules prepared in Example 2 above. Images were taken immediately following final mixing (shown in FIG. 6) and again six hours after mixing (shown in FIG. 7). The formulation containing methyl hydrogen silicone fluid microcapsules prepared in Example 2 (shown to the right in FIGS. 6 and 7) showed greatly increased product stability, as demonstrated by the lack of in-product expansion or expansion before the desired latency period, as referred to earlier. This contrasted and showed a surprising improvement over the instability of conventionally prepared methyl hydrogen silicone fluid microcapsules shown to the left in FIGS. 6 and 7. That conventionally prepared system exhibited substantial, undesired expansion, as evidenced by the bubbles or foaming activity over the top of the system shown to the left in FIG. 7.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method for producing a single shell microcapsule having a reactive core comprising:

preparing a mixture comprising:
    providing a reactive core material in the form of a blowing agent, the blowing agent being insoluble in water;
    mixing the blowing agent with a protective secondary core material and water to produce a mixture, the protective secondary core material being insoluble in water, the blowing agent and the protective secondary core material being chemically non-reactive with one another, the protective secondary core material being miscible with the reactive core material, the blowing agent being more hydrophobic than the protective secondary core material;
    allowing the protective secondary core material to at least one of protect and surround the more hydrophobic blowing agent, with the difference in hydrophobicity between the blowing agent and the protective secondary core material driving the protection and surrounding of the blowing agent so that the presence of the blowing agent is at least one of minimized and non-existent at a droplet or aqueous interface;
preparing a prepolymer solution including a shell material separately from the mixture;
admixing the mixture and the prepolymer solution so that the shell material microencapsulates the protective secondary core material and the reactive core material therewithin, thereby forming a slurry including a plurality of single shell microcapsules, each of the single shell microcapsules containing the reactive core material surrounded by the protective secondary core material and the shell material, which is exterior to the protective secondary core material and at least one of polymerized and cross-linked;
rinsing the plurality of single shell microcapsules; and
drying the plurality of single shell microcapsules to form a free flowing powder.

2. The method of claim 1 wherein the blowing agent is methyl hydrogen silicone fluid.

3. The method of claim 2 wherein the shell material included in the prepolymer solution is selected from the group consisting of polyoxymethylene urea, melamine modified polyoxymethylene urea and resorcinol modified polyoxymethylene urea and mixtures thereof.

4. The method of claim 1 wherein the protective secondary core material is selected from the group consisting of acrylate, methacrylate, epoxy and mixtures thereof.

5. The method of claim 1 comprising incorporating the free flowing powder into at least one of an expandable sealant and an adhesive, wherein the protective secondary core material is adapted to chemically react with another component of the at least one of an expandable sealant and adhesive.

6. The method of claim 1 comprising mixing the free flowing powder, including the plurality of single shell microcapsules, with at least one of a curing agent, a binder and a reactive component to form at least one of an expandable sealant and adhesive, the reactive component adapted to react with the microencapsulated blowing agent when the at least one of an expandable sealant and adhesive is activated.

7. The method of claim 6 comprising coating the at least one of an expandable sealant and adhesive on threads of a fastener.

8. A method of making at least one of an expandable sealant and adhesive comprising:

mixing a blowing agent with a protective secondary core material and water to produce a mixture, the blowing agent being more hydrophobic than the protective secondary core material;

allowing the protective secondary core material to at least one of protect and surround the more hydrophobic blowing agent, with the difference in hydrophobicity between the blowing agent and protective secondary core material driving protection of the blowing agent so that the presence of blowing agent is at least one of minimized and non-existent at the droplet or aqueous interface during the microencapsulation process;

admixing the mixture and a shell material so that the shell material microencapsulates the protective secondary core material and the blowing agent therewithin, thereby forming a plurality of single shell microcapsules, each of the single shell microcapsules containing the blowing agent surrounded by the protective secondary core material and polymerized the shell material, which is exterior to the protective secondary core material and at least one of polymerized and crosslinked;

isolating the plurality of single shell microcapsules;

mixing the plurality of single shell capsules with at least one of a curing agent, a binder and a reactive component to form at least one of an expandable sealant and adhesive, the reactive component adapted to react with the microencapsulated blowing agent when the at least one of an expandable sealant and adhesive is activated.

9. The method of claim 8 comprising coating the at least one of an expandable sealant and adhesive on a fastener so that when the fastener is installed in a work piece, the plurality of single shell microcapsules rupture, thereby releasing the blowing agent to initiate a reaction that enables the at least one of an expandable sealant and adhesive to at least one of create a seal and a bond between the fastener and the work piece.

10. The method of claim 9 wherein the protective secondary core material is an epoxy resin, wherein the epoxy resin is adapted to chemically react with the curing agent when the plurality of single shell microcapsules rupture.

11. The method of claim 10 wherein the curing agent is selected from the group consisting of aliphatic, cycloaliphatic, aliphatic modified amines and mixtures thereof.

12. The method of claim 8 wherein the blowing agent is methyl hydrogen silicone fluid, wherein the shell material is selected from the group consisting of polyoxymethylene urea, melamine modified polyoxymethylene urea and resorcinol modified polyoxymethylene urea and mixtures thereof, and wherein protective secondary core material is selected from the group consisting of acrylate, methacrylate, epoxy and mixtures thereof.

* * * * *